United States Patent
Siebenthaler

(10) Patent No.: US 10,476,798 B1
(45) Date of Patent: Nov. 12, 2019

(54) NETWORK SWITCH WITH DETERMINISTIC LONGEST PREFIX MATCH LOOKUP

(71) Applicant: Amazon Technologies, Inc., Seattle, WA (US)

(72) Inventor: John K. Siebenthaler, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 14/861,855

(22) Filed: Sep. 22, 2015

(51) Int. Cl.
*H04L 12/745* (2013.01)
*H04L 12/707* (2013.01)
*H04L 12/741* (2013.01)

(52) U.S. Cl.
CPC ............ *H04L 45/748* (2013.01); *H04L 45/22* (2013.01); *H04L 45/74* (2013.01)

(58) Field of Classification Search
CPC ........ H04L 45/748; H04L 45/22; H04L 45/74
See application file for complete search history.

(56) References Cited

U.S. PATENT DOCUMENTS

| | | | | |
|---|---|---|---|---|
| 7,782,853 | B2* | 8/2010 | Huang | H04L 45/54 370/389 |
| 8,886,677 | B1* | 11/2014 | Depelteau | G06F 16/2246 707/797 |
| 2002/0110122 | A1* | 8/2002 | Ramfelt | H04L 45/502 370/389 |
| 2012/0110049 | A1* | 5/2012 | Lines | G06F 17/30988 708/212 |
| 2012/0257506 | A1* | 10/2012 | Bazlamacci | H04L 45/00 370/235 |
| 2014/0244779 | A1* | 8/2014 | Roitshtein | H04L 61/103 709/213 |
| 2016/0142316 | A1* | 5/2016 | Wang | H04L 45/54 370/392 |
| 2017/0070431 | A1* | 3/2017 | Nidumolu | H04L 45/745 |

OTHER PUBLICATIONS

Jiang et al., Parallel IP Lookup using Multiple SRAM-based Pipelines, 2008 IEEE International Symposium on Parallel and Distributed Processing, ISBN: 978-1-4244-1693-6 (Apr. 14-18, 2008) (Year: 2008)*

* cited by examiner

*Primary Examiner* — Habte Mered
*Assistant Examiner* — Brian P Cox
(74) *Attorney, Agent, or Firm* — Klarquist Sparkman, LLP

(57) ABSTRACT

A network switch that provides deterministic and configurable logic for longest prefix matching (LPM) lookups. For an LPM lookup, a hardware pipeline proceeds sequentially through each prefix length group in decreasing or increasing order of prefix length. Each pipeline stage corresponds to a unique group of one or more prefix lengths. For each group there are 0 or more associated memory blocks (e.g., SRAM) that are active. Which memory blocks are associated with which stage of the pipeline is dynamically configurable. The index of the packet for the current prefix length group is obtained, and all active memory blocks for that prefix group are accessed simultaneously and searched at that index. Once the packet passes through all of the pipeline stages, a longest matched prefix can be used to obtain a next hop address.

18 Claims, 9 Drawing Sheets

NETWORK SWITCH WITH DETERMINISTIC LONGEST PREFIX MATCH LOOKUP

BACKGROUND

Traffic on the Internet has quickly grown and continues to expand at unprecedented rates. Network switches play a critical role in sustaining that growth. Data to be passed by switches is generally divided into a series of packets that can be transmitted between devices. Packets include control information and payload data. The control information includes information used to deliver the payload data. For example, control information can include source and destination network addresses, packet sequencing identification, error detection codes, and the like. Generally, control information is found in packet headers included within the packet.

Generally, network switches have two primary planes: a control plane and a data plane. The control plane is a management plane that configures the data plane. The data plane receives packets on input ports and transmits the received packets to output ports based on the configuration. Communication between the control plane and data plane can be accomplished through a communications bus (e.g., PCIe).

Network packets can be forwarded based on longest prefix matching algorithms. The longest prefix matching algorithm is used to select an entry from a forwarding table to determine a next hop to forward incoming packets. In one technique, in order to conserve memory space, a hash table stores only a quotient, while a remainder is used as an index to the hash table, which reduces a width of table entries. However, such approaches fail to provide deterministic lookup throughput guarantees due to worst-case multiple lookups in a single memory block.

DETAILED DESCRIPTION

The embodiments described herein provide deterministic and configurable hardware and software logic for longest prefix matching (LPM) lookups. For an LPM lookup, a hardware pipeline proceeds sequentially through each prefix length group in decreasing or increasing (depending on the design) order of prefix length. Each pipeline stage corresponds to a unique group of one or more prefix lengths. For each group there are 0 or more associated memory blocks (e.g., SRAM) that are active. The index of the packet for the current prefix length group is obtained, and all active memory blocks for that prefix group are accessed simultaneously and searched at that index. Once the packet passes through all of the pipeline stages, a longest matched prefix can be used to obtain a next hop address.

This approach gives a hardware pipeline equivalent of offering multiple slots per bucket. The number of slots available per bucket in a prefix size group is equal to the number of memory blocks allocated to the prefix size group. The pipeline provides a deterministic output of one lookup per cycle. Additionally, the memory blocks can be partitioned amongst the different prefix length groups dynamically so that the deterministic throughput can be achieved without making assumptions on the distribution of prefix lengths, and without duplicating the entire prefix set in memory. As prefixes arrive to be inserted, software can examine a current load for the corresponding prefix length groups and choose whether to allocate another block for that particular prefix length group.

Figure 1:
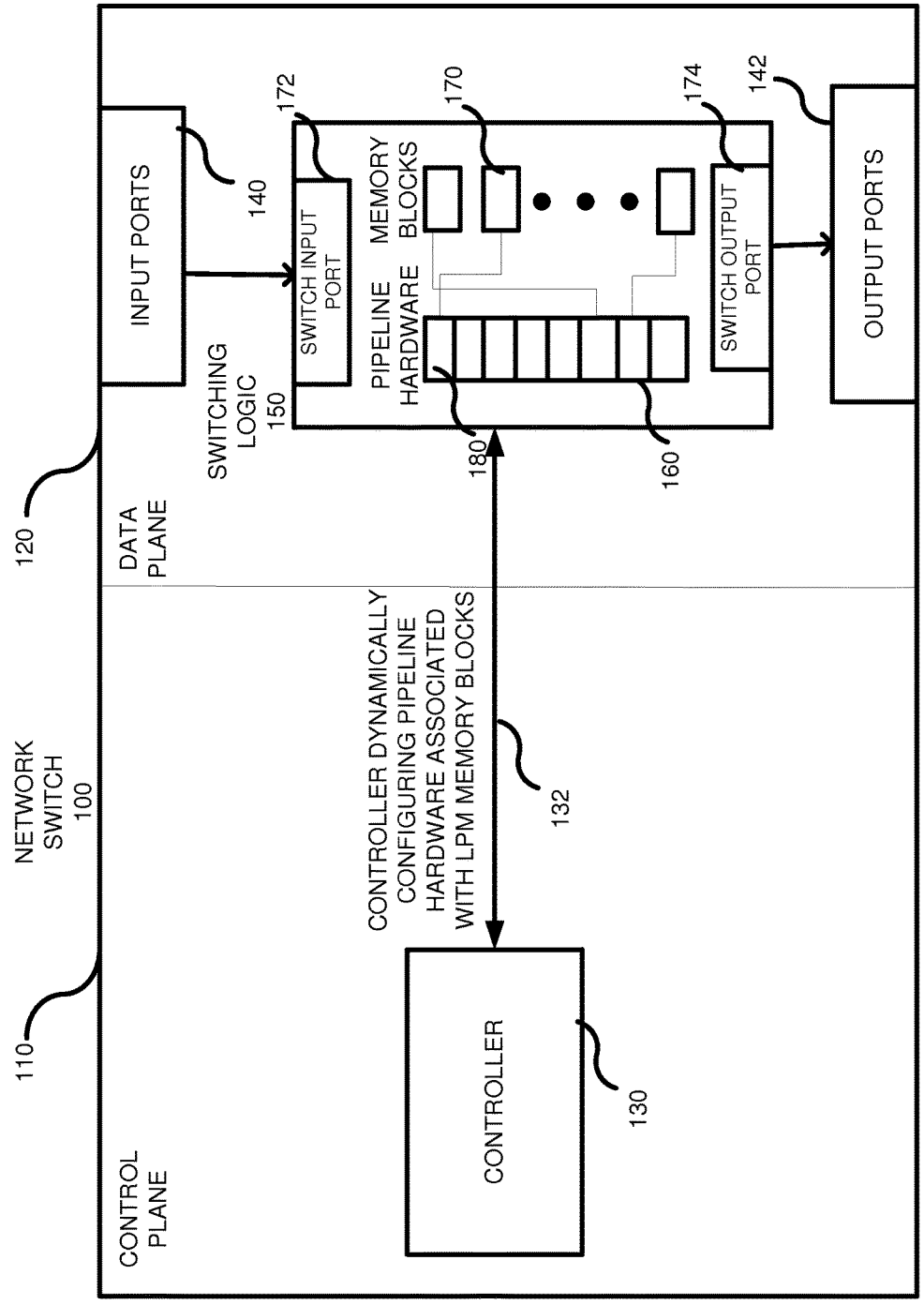
FIG. 1 is an embodiment of a network switch, wherein a pipeline is included in switching logic in order to perform longest prefix matching lookups.

FIG. 1 is a first embodiment of a network switch 100 that can perform LPM lookups deterministically. The network switch 100 includes a control plane 110 and a data plane 120. The control plane 110 is generally a management layer for configuring, updating, and controlling the data plane 120. The control plane includes a controller 130, which can be a Central Processing Unit (CPU), processor, microcontroller, or any hardware logic capable of configuring the data plane. A communications bus 132 allows communications between the controller 130 and the data plane 120. The communications bus 132 can be any desired bus type, such as PCI, PCIe, AGP, etc. The data plane 120 includes input port 140 and output port 142 used for receiving and sending network packets, respectively. Switching logic 150 is positioned intermediate the input and output ports. The switching logic 150 includes hardware for switching in accordance with layer 2, layer 3 or both, although FIG. 1 is shown more generically to include only hardware used to perform LPM lookups. For example, the switching logic 150 is shown including a hardware pipeline 160 and individual memory blocks 170 positioned between a switch input port 172 and a switch output port 174. The pipeline 160 includes a plurality of stages (such as is shown by a first stage at 180), wherein each stage includes a register for storing a current packet being analyzed by that stage. The stage also includes hardware for calculating an index and for performing an LPM lookup in the memory blocks 170 using the calculated index. The memory blocks 170 can be single port memories, wherein each block can be accessed independent of the other memory blocks and simultaneously. Such a configuration allows each stage of the pipeline to perform its respective part of an LPM lookup in parallel with the other stages.

As described further below, the stages of the pipeline 160 are configurable such that different memory blocks 170 can be assigned to the different stages dynamically. The controller 130 controls the configuration by performing writes to the switching logic 150. In this way, more popular prefixes can have more memory allocation by which to store the prefixes. Likewise, prefixes that are not used can have no memory allocation. Additionally, as new prefixes are added to the switch, the controller 130 can allocate new memory blocks and change the memory configuration by associating one of the hardware stages of the pipeline with the new memory block.

Figure 2:
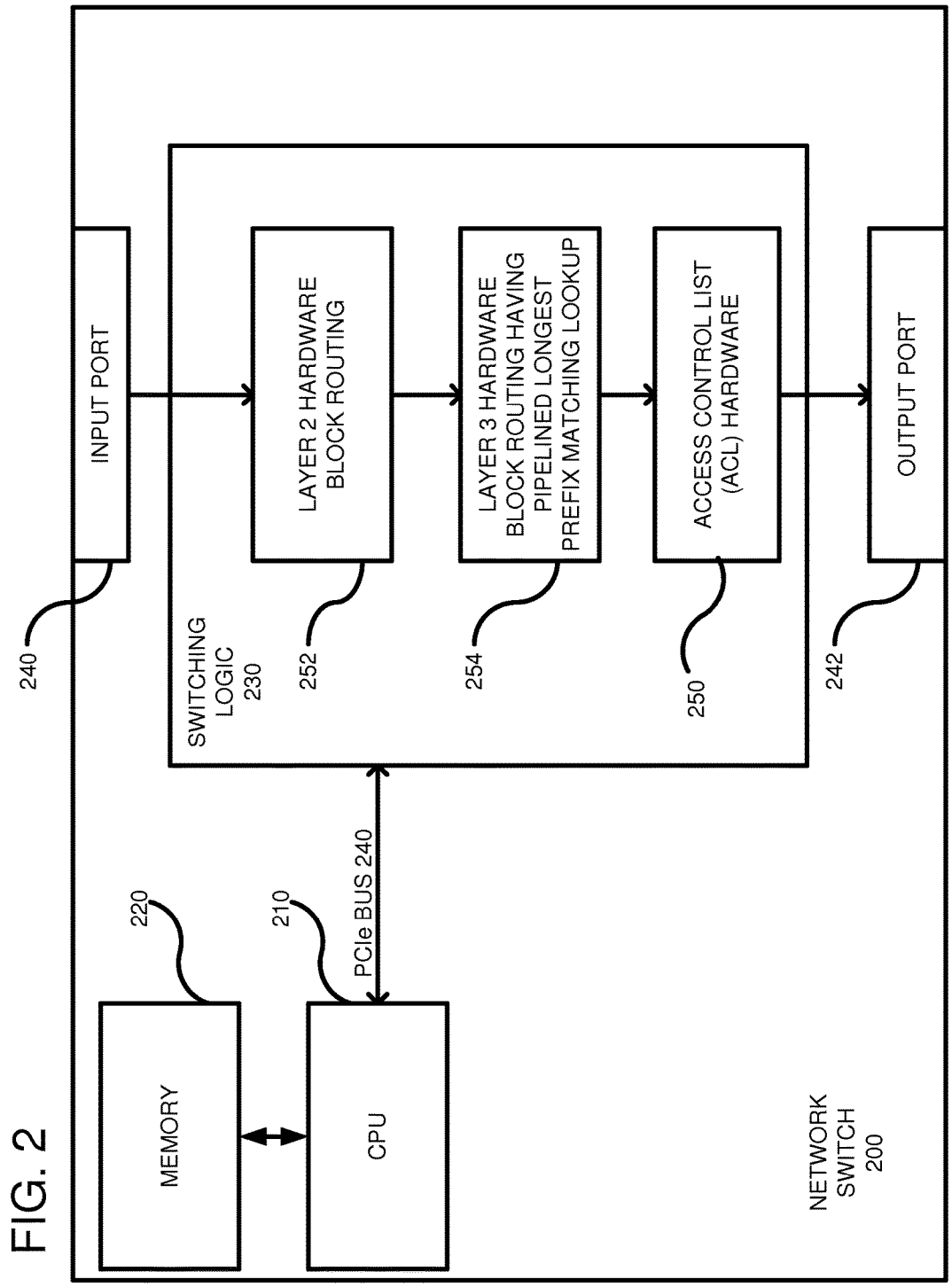
FIG. 2 shows further details of an embodiment of a network switch including layer 2 and layer 3 switching hardware, wherein the pipeline of FIG. 1 is included in the layer 3 switching hardware.

FIG. 2 shows a detailed example of an embodiment of a network switch 200. In this embodiment, a CPU 210 is coupled to a memory 220 and to switching logic 230 through a PCIe bus 240 (other protocols and bus types can be used). The switching logic 230 is positioned between an input port 240 and an output port 242, which are typically adapted to receive network cables, such as Ethernet cables. The switching logic 230 can be a single ASIC integrated circuit or divided into multiple integrated circuits. The switching logic 230 can include multiple different hardware logic blocks including a Layer 2 hardware block 252, a Layer 3 hardware block 254, and an Access Control List (ACL) hardware block 250. The layer 2 hardware block 252 relates to an Ethernet layer and can forward packets based on MAC tables. The layer 3 hardware block 254 relates to forwarding based on a longest prefix match of an IP address. The ACL block 250 relates to permissions and can include rules whether to drop packets. The different hardware blocks can be coupled in series and additional hardware blocks can be added based on the design.

Packets pass from the input port 240 to the output port in accordance with the configuration of the hardware logic blocks 250, 252, 254. Although each of the hardware blocks 250, 252, 254 can be configurable, the focus of the embodiments herein relates to the configuration of the layer 3 hardware block 254, particularly the configuration of that block for LPM lookups. Additionally, although only a single input and output port are shown, usually there are multiple ports on the switch and each has similar logic as shown in FIG. 2 in parallel.

Figure 3:
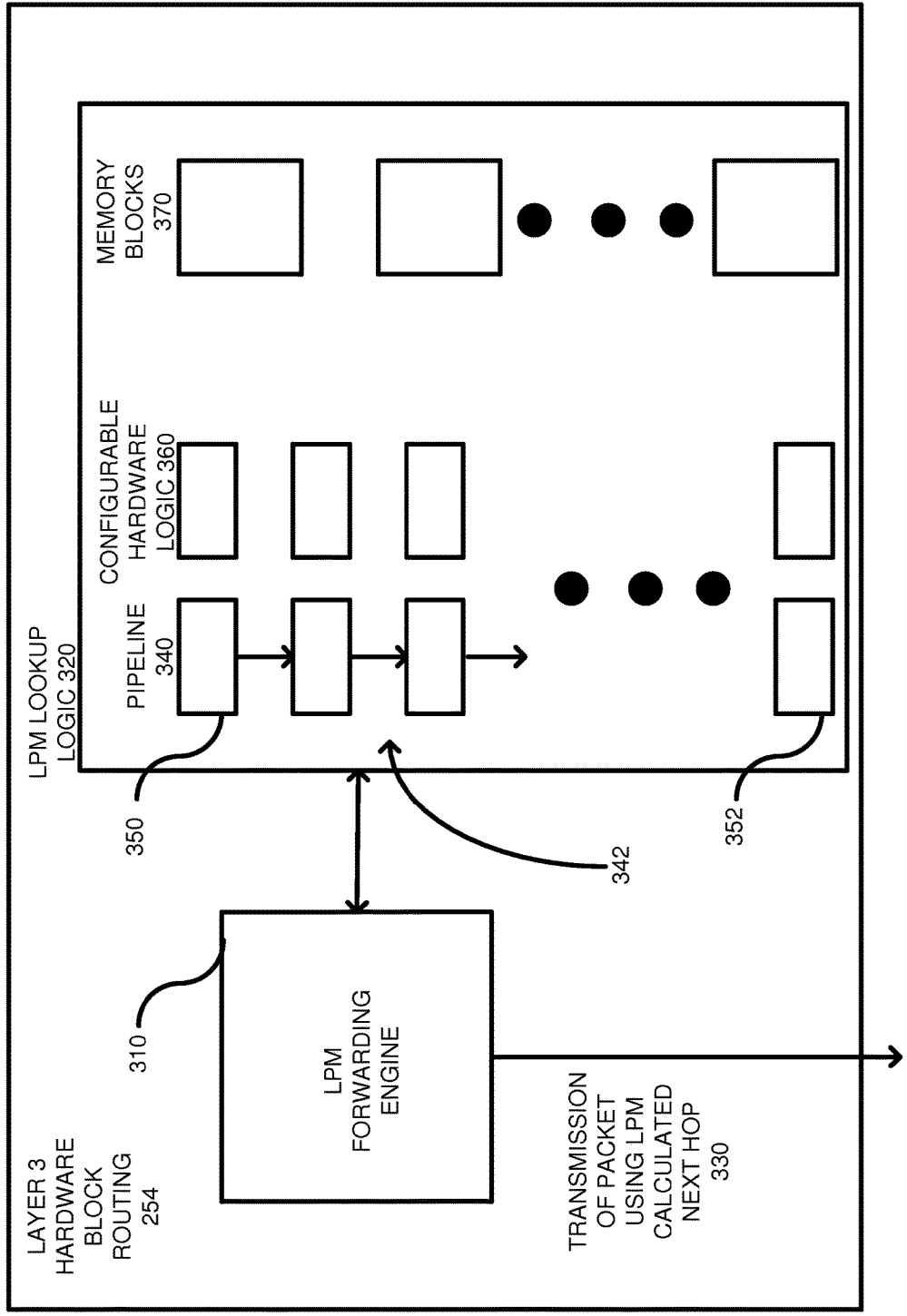
FIG. 3 is an embodiment showing the layer 3 switching hardware of FIG. 2, including configurable hardware that allows dynamic updates of memory associations for longest prefix matching lookups.

FIG. 3 is an embodiment showing further details of the layer 3 hardware block 254 from FIG. 2. The layer 3 hardware block 254 includes an LPM forwarding engine 310 and LPM lookup logic 320. The LPM forwarding engine 310 can analyze each LPM match that occurred in the LPM lookup logic 320 and determine which prefix is the longest that matched. A next hop address associated with the longest prefix can then be used when transmitting the packet, as indicated at 330. Typically, the transmission is to the ACL hardware block. The LPM lookup logic 320 can include a pipeline 340 including multiple stages 342 coupled in series. For example, a first stage in the series is a stage 350 and a last stage in the series is a stage 352. Any number of stages can be added to the pipeline, but a typical size is 9 stages. A packet enters the pipeline at the first stage 350 and exits at the last stage 352. Each stage performs an independent LPM lookup, but on different prefix lengths. Typically, an IP address is a dotted-decimal address, followed by a slash, then a number from 0 to 32, e.g., a.b.c.d/n. The dotted decimal portion is the IPv4 address while the number following the slash is a prefix length. Thus, different prefix lengths can include /32, /31, /30, etc. The differing prefix lengths can be grouped together into what is called a "tread". An example, tread can include /32, /31, /30 and /29. A next tread can include /28, /27, /26, and /25. Each tread includes different prefixes, meaning no prefixes are repeated in the other treads. Thus, each pipeline stage analyzes a group of prefixes simultaneously and all of the stages analyze their respective tread in parallel. In this way, when a packet exits the pipeline 340, the LPM lookup is completed and the packets are kept in the original order in which they were received. Thus, with every cycle, the pipeline shifts one packet from the last stage 352 and the LPM forwarding engine 310 can forward the packet with its next hop IP address, such as by transmitting the packet to the ACL hardware 250 (FIG. 2). The sending of the packets on each cycle allows the LPM forwarding engine to transmit packets deterministically at fixed intervals and in the original order received.

Figure 4:
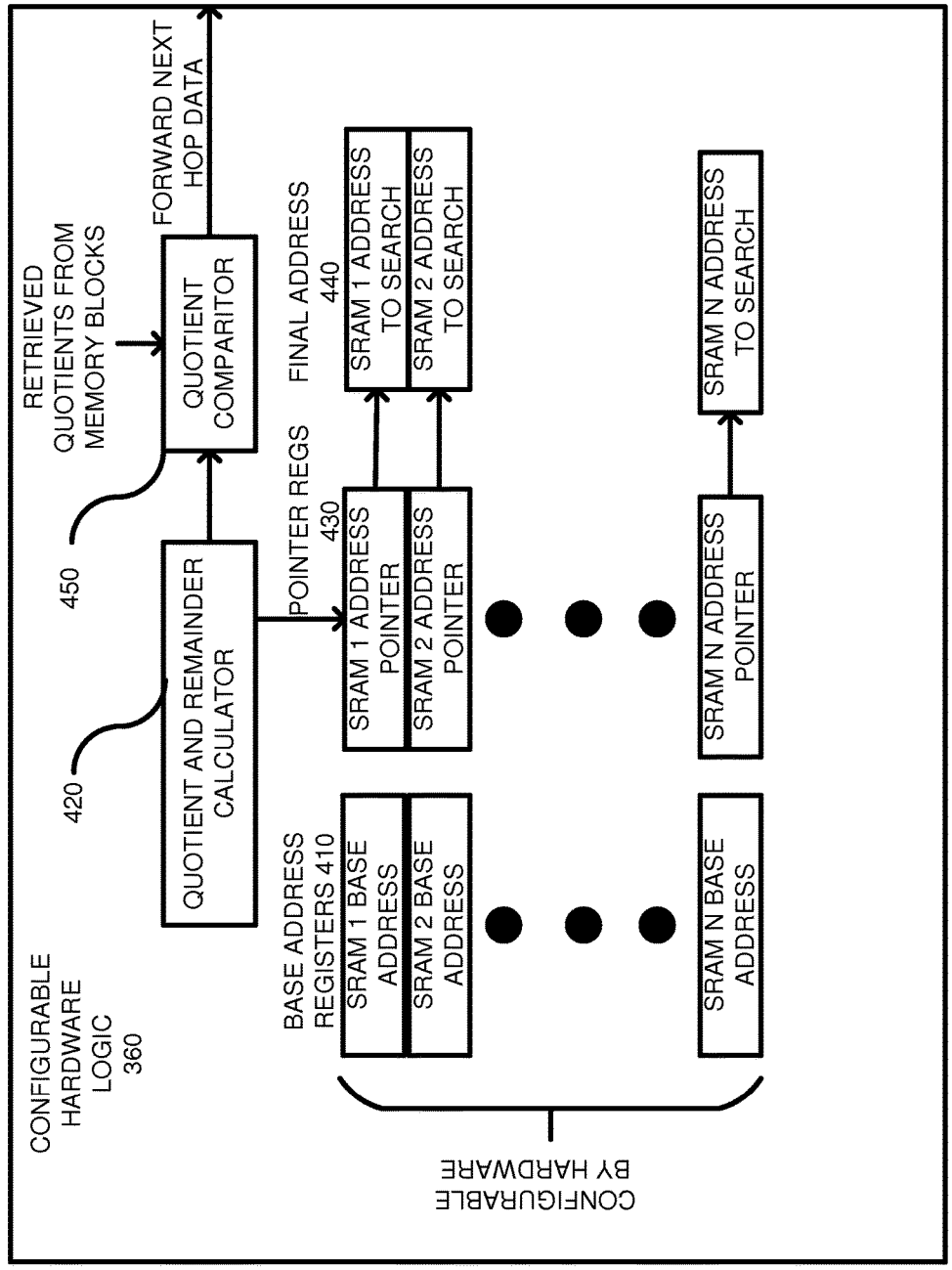
FIG. 4 shows an embodiment of the configurable hardware of FIG. 3.

Each stage 342 also includes configurable hardware logic 360, an example of which is shown in FIG. 4. The configurable hardware logic 360 can be programmed by the control plane to be associated with one or more of memory blocks 370. Alternatively, the controller 130 can determine that no memory blocks 370 are associated with a stage. As discussed further below, the configurable hardware logic 360 can use the packet data to generate an index. The index, in turn, can be used to generate an address of a memory entry in each memory block. The configurable hardware 360 can also compare data obtained from the memory entry to candidate data to determine if a match is found. Any matching data is flagged so that the LPM forwarding engine can determine which match between each pipeline stage was the longest prefix match. Each of the memory blocks 370 is typically a single-port SRAM that is independently accessible from the other memory blocks so that each stage 342 can perform its respective lookup on its designated prefixes. Other memory types can be substituted, but single-port SRAM is illustrated because it is more economical.

FIG. 4 shows an embodiment having further details of the configurable hardware logic 360. The configurable hardware logic 360 can include a number of registers and hardware logic used to perform the LPM lookup. The configurable hardware logic 360 is shown for a single stage. Each stage can include registers 410 for storing a plurality of base addresses. The base addresses can be written to by the controller 130 in order to assign a memory block to the stage. Thus, to assign a new memory block to the stage, the controller 130 can use an open register and write a valid base address therein. A valid flag (not shown) can be used to indicate which base addresses are active.

The configurable hardware logic 360 can further include a quotient and remainder calculator 420. The calculator 420 can include a Linear Feedback Shift Register (LFSR) to implement the following formula: $g(x)=X^{16}+X^8+X^6+X^5+X^4+X^2+1$. The LFSR performs divisions through shift and XOR operations. Every cycle, one bit of the prefix is shifted into the LFSR and at the end of the division, the LFSR contains the remainder. The remainder can then be loaded into the pointer registers 430, which store an index into the memory blocks. The final address 440 can be obtained by adding the base address 410 with its associated pointer register 430. The final address 440 can be used to point to memory block entries. The memory block entry can include a quotient that is input into a quotient comparator 450. The comparator 450 can compare the quotient from the memory entry with the calculated quotient from calculator 420. If a match is found, then a next hop address obtained from the matched memory entry can be forwarded to the LPM forwarding engine 310, for example.

Figure 5:
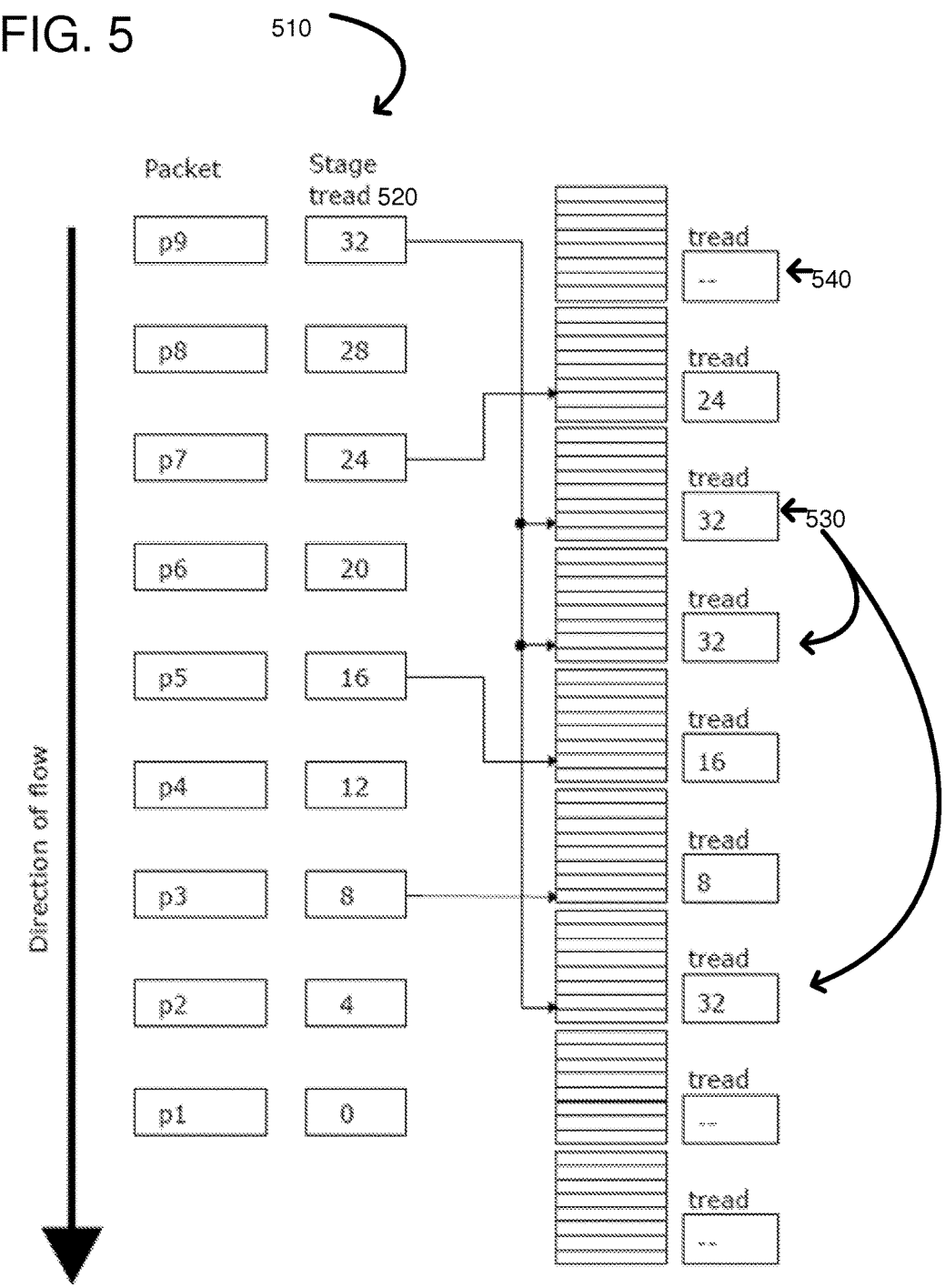
FIG. 5 illustrates a specific example of a pipeline with various memory associations with pipeline stages.

FIG. 5 is a very detailed example of a pipeline 510 in which 9 packets (P1-P9) are currently within the pipeline in different stages. Each packet can be stored in a memory buffer or register associated with a stage so that the packets pass through each of the memory buffers in series. P1 was received first in time and P9 last in time. Each stage shows a corresponding stage tread 520. Notably, the stage tread 520 for each stage is different. Each stage tread 520 can be associated with a group of one or more prefixes. In one example, the /32 stage tread represents /32, /31, /30, and /29 prefixes. The stage tread associated with the first stage points to three different memory blocks, shown at 530. Other stages, such as the stage associated with stage tread 28 and packet 8, do not point to any memory locations. Thus, a potential configuration is to point to one or more memory blocks or to none. Additionally, as shown, the /32 memory blocks need not be contiguous blocks. An available memory block is shown at 540. At any desired time, the controller 130 can dynamically reconfigure the memory blocks by assigning a memory block to a particular stage, such as by writing to the base address field 410 as described above. By dynamically, it is meant that the pipeline never stops cycling while the memory block is assigned to a stage. Once written to the base address 410, upon the next cycle, the memory block is integrated into the flow. It should also be noted that the tread sizes for each stage can be configured and are variable. Thus, one stage can be associated with 4 prefixes, while another stage is only associated with one prefix.

Figure 6:
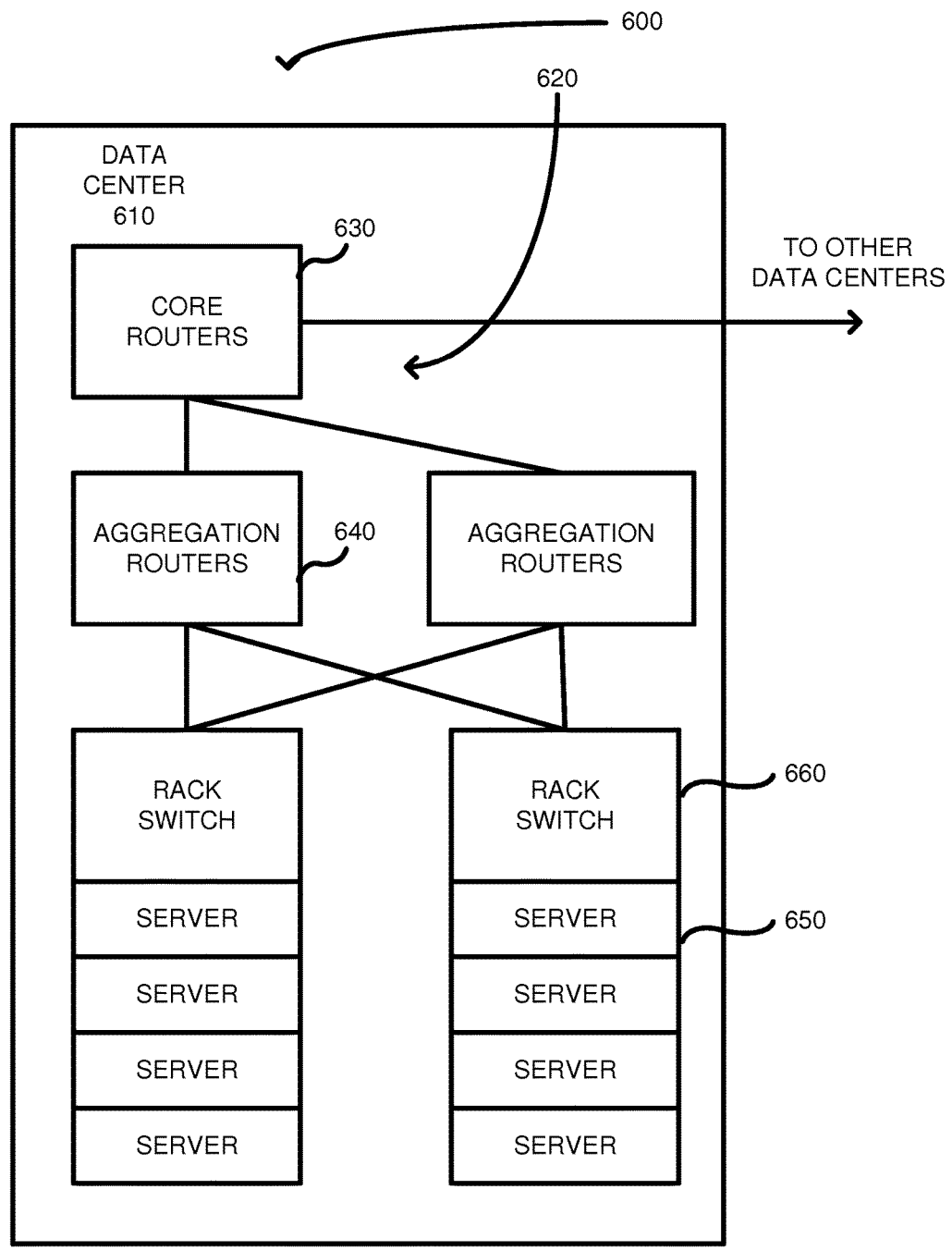
FIG. 6 shows an example environment in which the network switch can be used.

FIG. 6 illustrates an environment 600 in which the network of routers and switches can be used. In this example, the environment 600 includes a plurality of data centers including data center 610 coupled together by routers, shown generally at 620. Different levels of routers can be used. For example, core routers 630 can be coupled to other core routers in other data centers within a service provider environment. The routers 630 read address information in a received packet and determine the packet's destination. If the router decides that a different data center contains a host server computer, then the packet is forwarded to that data center. If the packet is addressed to a host in the data center 610, then it is passed to a network address translator (NAT) (not shown) that converts the packet's public IP address to a private IP address. The NAT also translates private addresses to public addresses that are bound outside of the datacenter 610. Additional aggregation routers 640 can be coupled to the NAT to route packets to one or more racks of host server computers 650. Each rack 650 can include a switch 660 coupled to the multiple host server computers. Although one core router 630 and two aggregation routers 640 are shown, in a real data center there can be many more routers and the routers can be grouped into areas as described herein. Additionally, any number of rack switches can be used. The embodiments described herein are generally used in the rack switches 660. However, the configuration can be extended to other switches, such as routers.

Figure 7:
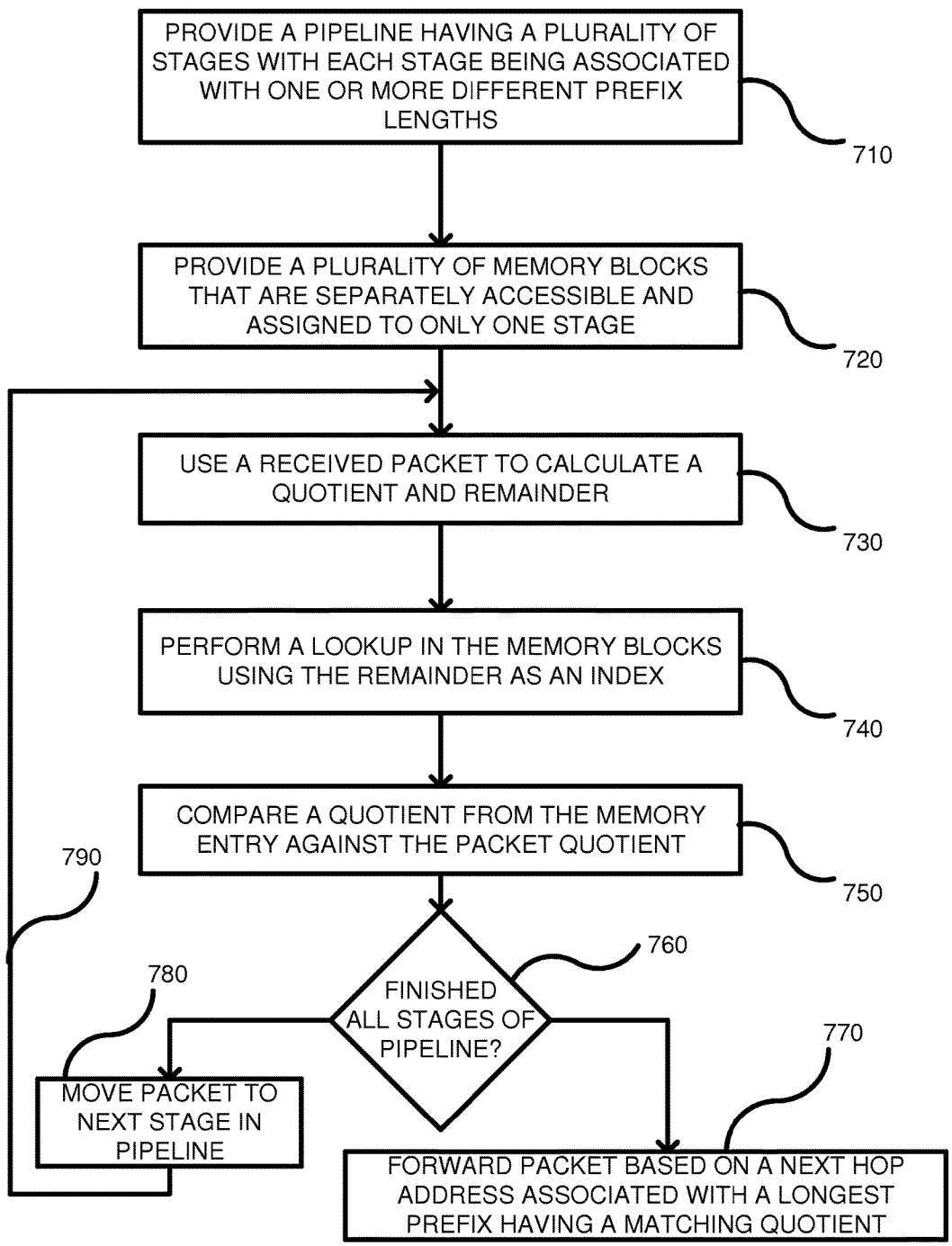
FIG. 7 is a flowchart of a method according to one embodiment for performing a longest prefix matching lookup.

FIG. 7 is a flowchart of a method for performing longest prefix matching in a network switch. In process block 710, a pipeline is provided having a plurality of stages with each stage being associated with one or more different prefix lengths. Packets generally are received by the network switch on an input port. The packets include a source and destination IP address and the network switch determines a next hop. More specifically, the network switch maintains a routing table with a next hop IP address, which specifies the next closest router in a routing path to the destination IP address. The longest prefix matching lookup is used to determine the next hop IP address and the pipeline is used as a deterministic hardware structure to perform the longest prefix matching lookup. In process block 720, a plurality of memory blocks are provided that are separately accessible and each memory block is assigned to only one stage. Multiple memory blocks can be assigned to the same stage, but a memory block is not assigned to more than one stage. In this way, each stage can search its associated memory blocks in parallel with the other stages without conflict. Additionally, single-port Random Access Memory (RAM), such as SRAM, can be used, which is more economical than dual-port RAM, or other memory types.

In process block 730, a received packet can be used to calculate a quotient and remainder. As described above, calculation of a quotient and remainder can be performed using a variety of techniques, such as using a LFSR as is described in "*SUSE: Superior Storage-Efficiency for Routing Tables Through Prefix Transformation and Aggregation*," by Fong Pong, IEEE (2009). Calculation of the quotient and remainder is typically performed at each pipeline stage for different prefix lengths. In process block 740, a lookup can be performed using the remainder as an index into the memory blocks. Each stage in the pipeline operates on a different packet and performs a lookup using the remainder associated with that packet. Additionally, each stage only performs the lookup on its associated memory blocks. As previously discussed, the index can be added to a base address, which is dynamically configurable. If there are multiple memory blocks associated with a stage, the index can be used in parallel with all of the memory blocks associated with that stage. For example, in FIG. 5, the first stage calculates a single index that is used for all memory blocks 530. In process block 750, a memory entry in the memory block that is determined using the index contains a quotient that can be compared to the packet quotient determined in process block 730. If there is a match between the quotients, then a next hop IP address can also be obtained from the memory entry. If there is not a match, then no next hop IP address is available for that stage.

In decision block 760, a check is made whether the packet has finished all stages. Notably, the packets proceed through each stage of the pipeline regardless of whether a matching quotient is found. Such a structure provides a guaranteed switching period of time from input to output. If decision block 760 is answered in the affirmative, then in process block 770, a determination is made as to which of the stages that had matching quotients are associated with the longest prefix. The next hop IP address obtained from the stage with the longest prefix is used to forward the packet. For example, the memory entry associated with the determined stage can include a pointer to a next hop address and that next hop address can be retrieved and used as an address to forward the packet. If decision block 760 is determined in the negative, then in process block 780, the packet is moved to the next stage in the pipeline and a lookup is performed in that stage as indicated by arrow 790. Process blocks 730, 740, 750, and 760 are then repeated and the loop continues until the packet passes through all of the stages. Thus, for a single packet, multiple lookups are performed in series, but for different prefix lengths. Additionally, multiple packets have lookups performed in parallel for different prefix lengths using the pipeline. Thus, each stage performs a portion of a total LPM lookup for its respective prefix. Once the packet passes through all of the stages, all of the prefixes have been analyzed and the overall lookup LPM is considered completed. The pipeline thereby allows the packets to emerge from the pipeline at a deterministic rate, such as one packet per clock cycle or other deterministic time intervals (e.g., one packet per second). Additionally, an ordering of the packets is maintained by the pipeline so that packets are not routed in a different order in time than they were received by the network switch.

Figure 8:
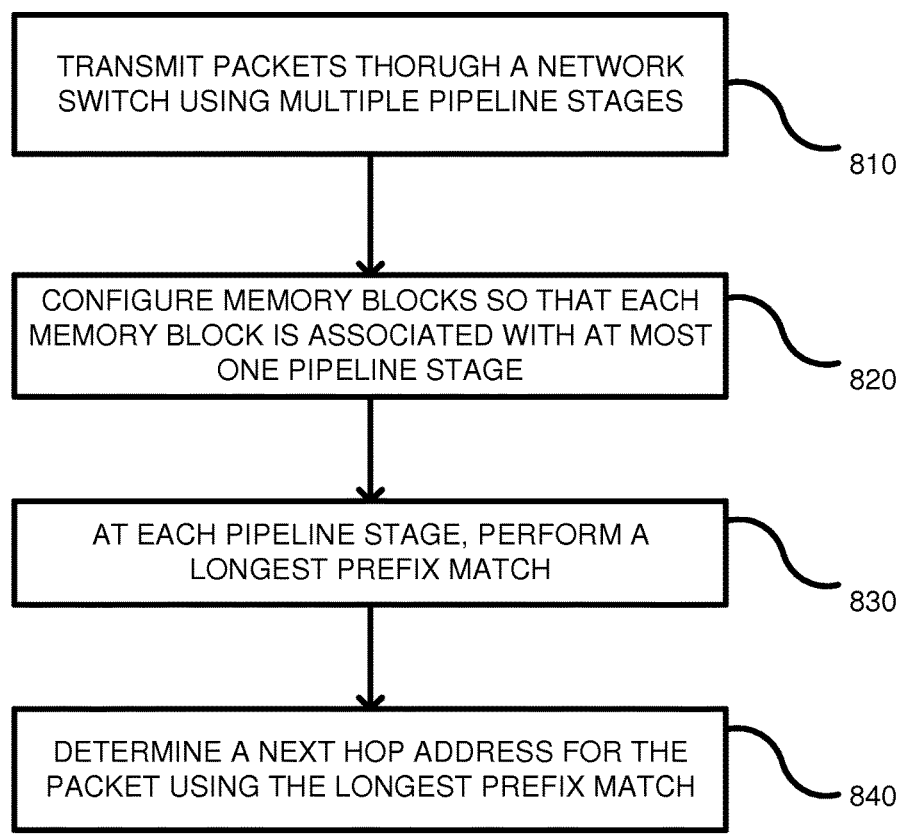
FIG. 8 is a flowchart of a method according to another embodiment for performing a longest prefix matching lookup.

FIG. 8 is a flowchart according to another embodiment for performing longest prefix matching in a network switch. In process block 810, packets are transmitted through a network switch using multiple stages in a pipeline. On every cycle of the switch, a packet moves to a next stage in the pipeline, and when the packet emerges from the pipeline, it is transmitted by the LPM forwarding engine to a next logic block in the switch, such as the ACL hardware of FIG. 2. Each stage in the pipeline is associated with one or more packet prefixes of differing lengths than prefixes from other stages. Thus, no two stages of the pipeline are associated with the same prefix. In process block 820, the memory blocks are configured so that each memory block is associated with at most one pipeline stage. This ensures that all of the pipeline stages can access the memory blocks without conflict using single-port RAM. In process block 830, each pipeline stage performs a longest prefix match lookup by searching all of the memory blocks associated with that stage. Thus, multiple packets have a portion of a total LPM lookup performed in parallel, with each packet on a different prefix from the other packets. The total LPM lookup is complete when the packet passes through all stages of the pipeline so that all prefixes are checked. Additionally, a stage can be associated with a plurality of memory blocks and that stage can be search the memory blocks in parallel using the same calculated index. In process block 840, a determination is made as to which stage (and thus which prefix) had a matching quotient. The stage with the longest prefix that matches is used for the determination of the next hop IP address. For example, the next hop IP address can be stored in the same memory entry as the quotient and it can be the IP address used as the final result of the LPM lookup. Alternatively, the memory entry can include a pointer to the IP address, so additional processing can be needed to obtain the next hop address.

Figure 9:
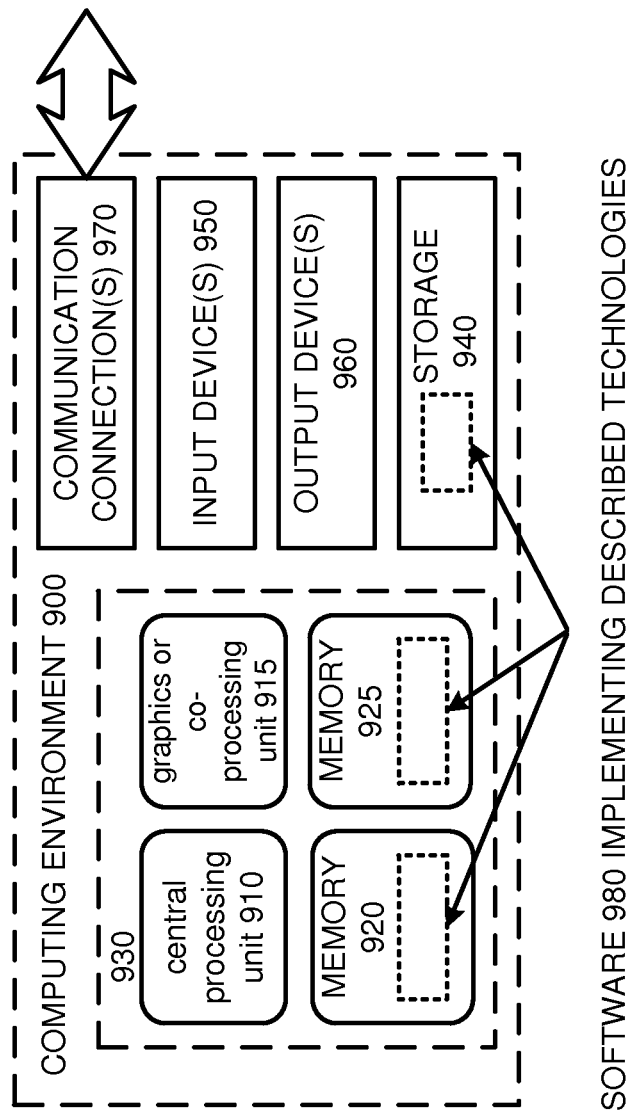
FIG. 9 depicts a generalized example of a suitable control plane for the network switch.

FIG. 9 depicts a generalized example of a suitable computing environment 900 that can be used for the control plane described herein. The computing environment 900 is not intended to suggest any limitation as to scope of use or functionality, as the innovations may be implemented in diverse general-purpose or special-purpose computing systems. With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, Flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as Flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application).

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, C, assembly language, or any other suitable programming language used in embedded systems. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of performing longest prefix matching lookups in a network switch, comprising:
   (a) providing a pipeline having a plurality of serially-coupled stages, each stage having a respective buffer for receiving a packet to be analyzed as it passes through the pipeline, and each stage being associated with a respective group of one or more differing prefix lengths;
   (b) providing a plurality of memory blocks that are separately accessible and assigned to the plurality of serially-coupled stages such that each memory block is assigned to no more than one stage for purposes of longest prefix matching lookups, but at least one of the plurality of serially-coupled stages is coupled to multiple memory blocks;
   (c) using the received packet, calculating a packet quotient and remainder;
   (d) performing a lookup in all of the plurality of memory blocks associated with a current stage in the pipeline using the remainder as a lookup index to access a memory entry;
   (e) comparing a stored quotient in the memory entry against the packet quotient to determine a matching quotient;
   (f) transmitting the packet to a next stage in the pipeline and repeating at least (d) through (f) until all the stages are completed; and
   (g) forwarding the packet based on a determined next hop address associated with a longest prefix length having the matching quotient;
   wherein each packet is passed through each of the plurality of serially-coupled stages of the pipeline, and wherein each stage of the plurality of stages performs a longest prefix matching lookup on the packet in its stage.

2. The method of claim 1, further including dynamically configuring one of the plurality of memory blocks so as to associate a stage of the plurality of serially-coupled stages with the one of the plurality of memory blocks.

3. The method of claim 1, wherein each memory block is a separately accessible single-port Random Access Memory.

4. The method of claim 1, wherein packets emerge from the pipeline at a deterministic rate.

5. An integrated circuit for a network switch, comprising:
   an input port to receive network packets;
   an output port to transmit the network packets;
   switching logic intermediate the input port and output port, the switching logic comprising:
      a packet pipeline including a plurality of serially-coupled stages for performing longest prefix matching lookups on the network packets received at the input port; and
      a plurality of memory blocks wherein each memory block is assigned to at most one of the plurality of serially-coupled stages in the packet pipeline, but at least one of the plurality of serially-coupled stages is coupled to multiple of the plurality of memory blocks, the plurality of memory blocks being configured to obtain addresses for forwarding the packets when the packets are transmitted from the output port; wherein each packet passes through each stage of the pipeline, and each stage performs a longest prefix matching operation on the packet in its stage.

6. The integrated circuit of claim 5, wherein the integrated circuit is included in a network switch and the network switch further comprises a control plane including a processor, wherein the processor is adapted to dynamically configure which memory blocks are assigned to which of the plurality of serially-coupled stages in the packet pipeline.

7. The integrated circuit of claim 5, wherein each stage in the packet pipeline is associated with one or more packet prefix lengths that are different packet prefix lengths than other stages.

8. The integrated circuit of claim 5, wherein the network packets are transmitted in series from a first of the plurality of serially-coupled stages to a last of the plurality of serially-coupled stages at a deterministic time interval.

9. The integrated circuit of claim 5, wherein at least a first stage of the plurality of serially-coupled stages has multiple of the plurality of memory blocks associated therewith which are searchable in parallel using hardware logic associated with the first stage.

10. The integrated circuit of claim 5, wherein the integrated circuit is included in a network switch and wherein the network switch includes a control plane and a data plane and the switching logic is in the data plane and the data plane further includes a layer 2 hardware block, a layer 3 hardware block, and an Access Control List block, wherein the switching logic is within the layer 3 hardware block.

11. The integrated circuit of claim 10, wherein the control plane includes a processor adapted to dynamically configure assignments of each memory block of the plurality of memory blocks to individual stages of the plurality of serially-coupled stages.

12. The integrated circuit of claim 5, wherein the packet pipeline includes a plurality of memory buffers coupled in series with one of the plurality of memory buffers per stage, so that each of the network packets moves through each of the memory buffers in series.

13. The integrated circuit of claim 5, wherein each of the plurality of serially-coupled stages includes hardware logic that searches only memory blocks of the plurality of memory blocks that are assigned to its respective stage.

14. The integrated circuit of claim 13, wherein each of the plurality of serially-coupled stages searches its assigned memory blocks in parallel with other of the plurality of serially-coupled stages.

15. A method of performing longest prefix matching lookups in a network switch, comprising:
- transmitting packets through the network switch using a pipeline including multiple pipeline stages that are serially coupled together, wherein each pipeline stage is associated with a respective group of one or more packet prefix lengths;
- configuring memory blocks so that each memory block is associated with at most one of the multiple pipeline stages and at least one stage of the multiple pipeline stages is coupled to multiple memory blocks, and wherein at least one memory block is dynamically re-assigned from a first stage to a second stage, the second stage being different from the first stage;
- at each pipeline stage, performing a longest prefix matching lookup in all of the memory blocks that are associated with the pipeline stage; and
- determining a forwarding address for the packet using the longest prefix matching lookup found by the multiple pipeline stages.

16. The method of claim 15, wherein the at least one memory block is dynamically re-assigned using a processor within a control plane of the network switch.

17. The method of claim 15, wherein each memory block is separately searchable by its associated pipeline stage.

18. The method of claim 15, wherein the network switch switches network packets at a deterministic rate through the pipeline.

* * * * *